United States Patent
Mussaeus et al.

(10) Patent No.: US 7,130,733 B2
(45) Date of Patent: Oct. 31, 2006

(54) CONTROL METHOD FOR AN AUTOMATIC TRANSMISSION

(75) Inventors: Marc Andre Mussaeus, Eindhoven (NL); Maurice Didier Rienks, Vaals (NL)

(73) Assignee: Van Doorne's Transmissie B.V., Tilburg (NL)

( * ) Notice: Subject to any disclaimer, the term of this patent is extended or adjusted under 35 U.S.C. 154(b) by 129 days.

(21) Appl. No.: 10/510,736

(22) PCT Filed: Apr. 8, 2003

(86) PCT No.: PCT/EP03/03702

§ 371 (c)(1),
(2), (4) Date: Oct. 12, 2004

(87) PCT Pub. No.: WO03/085288

PCT Pub. Date: Oct. 16, 2003

(65) Prior Publication Data

US 2005/0228567 A1    Oct. 13, 2005

(30) Foreign Application Priority Data

Apr. 10, 2002 (EP) ................................. 02076403

(51) Int. Cl.
*G06F 7/00* (2006.01)
*G06F 17/00* (2006.01)
*G06F 19/00* (2006.01)

(52) U.S. Cl. ........................... 701/55; 701/51; 701/84; 701/95

(58) Field of Classification Search .................. 701/51, 701/55, 84; 477/77, 79, 86; 192/3.54, 3.55; G06F 7/00, G06F 17/00, 19/00

See application file for complete search history.

(56) References Cited

U.S. PATENT DOCUMENTS

| 4,282,957 | A | | 8/1981 | Nakano et al. |
| 4,627,312 | A | * | 12/1986 | Fujieda et al. ............... 477/124 |
| 4,790,418 | A | * | 12/1988 | Brown et al. .................. 701/51 |
| 4,935,872 | A | * | 6/1990 | Benford et al. ................ 701/51 |
| 4,936,167 | A | * | 6/1990 | Mehta ......................... 477/155 |
| 5,128,868 | A | * | 7/1992 | Imai et al. ..................... 701/51 |

(Continued)

FOREIGN PATENT DOCUMENTS

DE     195 47 082    * 12/1995

OTHER PUBLICATIONS

Matsui Jun et al., An experimental study on the very slow reduction of torque in a variable capacity type fluid coupling, Turbomachinery, 2003, vol. 31 No. 12, pp. 739-744 (from Dialog(R) File 94, acc. No. 05635819).*

(Continued)

*Primary Examiner*—Cuong Nguyen
(74) *Attorney, Agent, or Firm*—Young & Thompson (57) ABSTRACT

Control method for effecting a gear shift in a stepped automatic transmission with an input shaft and an output shaft for transmitting power between two inertia components at distinct speed ratios with a first power transmission path and a second power transmission path being provided with a high clutch having an adjustable torque transmitting capacity $T_H$ and a low clutch having an adjustable torque transmitting capacity $T_L$ respectively. The method includes the steps of determining a gear set input torque Tin to be transmitted by the transmission in the direction from the input shaft to the output shaft and controlling the torque transmitting capacities $T_H$ and $T_L$ in dependency on the gear set input torque $T_{in}$ to be transmitted such that: a) if $T_{in} \geq 0$ then $T_H = T_{in}$ and $T_L = 0$ b) if $T_{in} < 0$ then $T_H = 0$ and $T_L = T_i$.

12 Claims, 3 Drawing Sheets

U.S. PATENT DOCUMENTS

| | | | | |
|---|---|---|---|---|
| 5,157,608 | A * | 10/1992 | Sankpal et al. | 701/58 |
| 5,168,449 | A * | 12/1992 | Benford | 701/51 |
| 5,172,602 | A * | 12/1992 | Jurgens et al. | 74/335 |
| 5,519,617 | A * | 5/1996 | Hughes et al. | 701/84 |
| 5,553,694 | A * | 9/1996 | Schulz et al. | 192/3.3 |
| 5,612,874 | A * | 3/1997 | Schulz et al. | 701/51 |
| 5,646,842 | A * | 7/1997 | Schulz et al. | 701/51 |
| 5,722,519 | A * | 3/1998 | Kirchhoffer et al. | 192/3.3 |
| 5,758,302 | A * | 5/1998 | Schulz et al. | 701/51 |
| 5,799,260 | A * | 8/1998 | Droste et al. | 701/51 |
| 5,802,490 | A * | 9/1998 | Droste | 701/51 |
| 5,835,875 | A * | 11/1998 | Kirchhoffer et al. | 701/51 |
| 5,931,885 | A * | 8/1999 | Kubo et al. | 701/51 |
| 5,950,781 | A | 9/1999 | Adamis et al. | |
| 5,954,776 | A * | 9/1999 | Saito et al. | 701/51 |
| 6,098,003 | A * | 8/2000 | Kozaki et al. | 701/51 |
| 6,122,583 | A * | 9/2000 | Kirchhoffer et al. | 701/51 |
| 6,128,565 | A * | 10/2000 | Tsutsui et al. | 701/51 |
| 6,259,983 | B1 | 7/2001 | Tsutsui et al. | 701/51 |
| 6,269,293 | B1 * | 7/2001 | Correa et al. | 701/51 |
| 6,278,926 | B1 * | 8/2001 | Jain et al. | 701/58 |
| 6,385,520 | B1 * | 5/2002 | Jain et al. | 701/51 |
| 6,449,546 | B1 * | 9/2002 | Sakamoto et al. | 701/51 |
| 6,449,548 | B1 * | 9/2002 | Jain et al. | 701/56 |
| 6,459,980 | B1 * | 10/2002 | Tabata et al. | 701/70 |
| 6,574,535 | B1 * | 6/2003 | Morris et al. | 701/22 |
| 6,649,548 | B1 * | 11/2003 | Shawver et al. | 442/398 |
| 6,736,757 | B1 * | 5/2004 | Kubo et al. | 477/144 |

OTHER PUBLICATIONS

Kagawa Hozumi, Transmission torque characteristics of over running clutch by using of NdFeB magnet, Electromagnetics Symposium Proceedings, 2003, vol. 15th, pp. 201-204 (from Dialog(R) File 94, acc. No. 05571807).*

Feng M et al., Inherent properties of the adjustable torque slipping clutch with skewed rollers, Proceedings of JAST Tribology Conf., 2000, vol. 3, pp. 194901954 (from Dialog(R) File 94, acc. No. 05066699).*

Sato et al., A study of suppreession method of driving shaft torque variations in automatic transmission vehicle. A study of reduced shift shock method for based onvehicles estimated driving shaft torque value, Jidosha Gijutsukai Gakujutsu Koenkai Maezurishu, 1993, No. 933, pp. 53-56 (from Dialog(R) File 94, acc. No. 01898235).*

* cited by examiner

CONTROL METHOD FOR AN AUTOMATIC TRANSMISSION

The present invention relates to a control method for a stepped automatic transmission as defined in the preamble of claim 1.

Such transmissions are generally known, e.g. from European patent 0 670 789, which is regarded included here by reference, and generally are used in a drive line of a motor vehicle for power transfer from an engine or a motor to the wheels of the vehicle at two or more discrete torque and rotational speed ratios. They consist of at least two clutches for shifting from one power transmission path within the drive line to another transmission path, either for a power transmission with a lower, i.e. smaller transmission speed ratio or for a higher, i.e. larger transmission speed ratio. The torque ratio of the transmission of course changing in the opposite direction. Said two types of shifting are respectively also denoted as down shift and up shift or gear shift in general.

In the early days of stepped automatic transmission only gear with positive torque transfer from the engine to the wheels shift said up shift, which is generally performed at accelerating the vehicle, could be performed quite well under simultaneous, i.e. uninterrupted torque transmission. Gear shifting with negative torque transfer, however, was performed without such uninterrupted torque transmission. Very often this type of control can still be found in vehicles as are typically driven in the United States of America. However, also more sophisticated transmission shift strategies have been developed, which became feasible because of the development and wide spread use of powerful microelectronics. The most elaborate transmission control strategies are able to perform both an up shift and a down shift with positive or negative torque transfer under continuous torque transmission in either direction, i.e. from the engine to the wheels and vice versa. These shifts are referred to as "clutch-to-clutch" shifts. Apart from a smoothness experience by the vehicle driver, a clutch-to-clutch shift is favourable in that it reduces shocks or vibrations within the transmission and obviates the use costly and large freewheels. An example of this development is provided by the dissertation of Bengt Jacobsen of 1993 at the Chalmers University of Technology, Goteborg, Sweden under the name of "Gear shifting with retained power transfer". In particular by the illustrative graph at page A43, it may be understood, however, that it is still a particular difficulty in the state of the art transmissions to correctly time and match the clutch engagement pressure at the respective clutches involved in the gear shift. In this respect, if the clutch is engaged too loosely, the engine speed will increase considerably (flair) which is not desired, whereas if it is engaged too hard, the engine will choke (tie-up) which is also undesired. In the state of the art transmission, a supposedly correct instant and force of engagement and/or disengagement of the clutches is found by empirical calibration, i.e. by trial and error.

The latter control strategy for an automatic transmission may consist of two control algorithms, one of which is selected the instant before the type of gear shift desired to be performed is initiated. In most cases, such selected control algorithm for performing the shift is subsequently required to be run through completely, i.e. performing all method steps contained therein. The one control algorithm is also known under the name of "Freigabe Schaltung". The other control algorithm is also denoted "Uberhohung Schaltung". One example of such control strategy for performing a gear shift is provided in the article "Doppelschaltungen bei Doppelkupplungsgetrieben—Double shifts at double-clutch-transmissions" in VDI Berichte no. 1170. P119. Another example is provided by the article "Die elektronische steuerung des automatischen Getriebes W5A 330/580 von Mercedes-Benz" by Rudolf Rosch and Gerhard Wagner in ATZ Automobiltechnische Zeitschrift 97 (1995), Heft 11, distributed by Friedr. Vieweg & Son, Wiesbaden.

The "Freigabeschaltung" control algorithm is in fact chosen for driving conditions requiring an up shift with negative transfer of torque, i.e. with the wheels driving the engine, alternatively denoted a so called engine braking circumstance, and for conditions requiring a down shift with positive transfer of torque, i.e. with transfer of engine power to the driven wheels. The "Uberhohungsschaltung" control algorithm being adapted to be used in the two inverse situations, i.e. an up shift at a positive transfer of torque and a down shift at a negative transfer of torque. Both control algorithms thereby comprise a so called torque phase, wherein the path through the transmission responsible for the transfer of torque is switched from one clutch to the other, and a so called shift phase, wherein the rotational speed ratio between the output and the input shafts of the transmission is switched. At the "Freigabe Schaltung" control algorithm, firstly the shift phase is performed and thereafter the torque phase is performed, while at the "Uberhohungsschaltung" firstly the torque phase and than the shift phase is performed. As an example, at down-shifting under positive torque transmission firstly the speed ratio of the transmission is shifted from high to low by partial, i.e. slipping, engagement of both clutches, during which procedure the torque is still being transferred by the high clutch, and only thereafter also the torque path through the transmission is effected through the low clutch by further engagement thereof.

Thus, in the known art two control algorithms are required for dealing with the four types of gear shifts identified in the above, while each control algorithm is in practice required to be performed, i.e. run through completely, or, otherwise, much (programming) effort is required to and means have to be provided for the exchange and conversion of the necessary information from the one control algorithm to the other to take account of a change in driving condition in real-time while the up- or down shift is still being performed.

The above described transmission control strategy performs quite well (after the tedious empirical calibration) in all situations wherein the relevant conditions do not alter while the shift is being performed. This will be the case in the majority of gear shifts performed. However, still the known control strategy may be optimised. In this respect, a serious disadvantage, which has not yet been tackled adequately, is the above-mentioned circumstance that it is difficult to change between the two control algorithms when the said relevant conditions do alter during the gear shift being performed. This may be the case e.g. when the sign of the torque to be transferred through the transmission changes, i.e. from positive to negative or vice versa. Also a change of mind of the driver set into action during a shift, e.g. effecting a sudden vehicle stop interrupting acceleration of the vehicle, or a sudden increased depressing of the speed pedal (kick-down), may require such change between the control algorithms.

The difficulty to handle such changing of the relevant conditions within the known control strategy also relates to the many discrete situations, i.e. combinations of relevant conditions and possible changes therein that may occur during the running through the selected control algorithm, i.e. performing all the method steps thereof. This difficulty is al the more grieving in that is in principle desired to foresee all such possible conditions and changes, so that quite some programming and even more calibration work is to be performed at each new design or modification of a transmission.

It is an objective of the present invention to arrive at a simple, i.e. elegant manner of transmission ratio control method for dealing with all such relevant conditions and possible changes therein, without the additional programming requirements and other drawbacks of the known control strategy for conventionally stepped automatic transmissions, at least minimising these, realising an optimised smoothness in gear shifting operations, i.e. with a minimised driver's awareness of the said operations.

According to the invention such control method may be arrived at by the features the characterising portion of claim 1. A transmission controlled in accordance with the basic idea underlying the current invention employs a simple but effective drive line model that describes and takes account of the relevant conditions in a generalised manner. Hereby all the said discrete situations are inherently taken into account.

With the drive-line model and control method according to the invention, it is possible to perform from within one single control algorithm any one of the four types of gear shifts identified in the above while satisfying the specific requirements thereof. It is also possible to interrupt a gear shift being performed, e.g. in response to a change in the relevant conditions, because the control algorithm according to the invention takes account of such conditions instantaneously. Thus, intrinsically, no loss of track of parameters can occur. Also, it has become possible to instantaneously activate the relevant components of the transmission towards the selected or desired type of gear shift, since the relevant transmission parameters are continuously updated, independently from the gear shift action.

With the new control method, an excellent and ultimately smooth gear shift action of a stepped automatic transmission may be realised by departing from the prerequisites generally accepted in the known art. The clutch-to-clutch gear shifts may be performed virtually unnoticeable, while the programming effort required for a shift performed according to the method of the invention is significantly reduced. This also accounts for the development problems encountered thereby.

In the new control method according to the invention, it is possible to realise that under all conditions and for all four types of gear shift identified in the above the transfer of torque is maintained virtually uninterrupted, at least optimised to a large extend, effecting a very smooth gear shift that is hardly unnoticeable by the driver. Moreover, at the manufacturer side, all relevant conditions and possible changes therein the transmission possibly may have to cope with are dealt with in a single control algorithm, requiring only a single calibration procedure compared to the two that were previously necessary. Also, where the state of the art transmissions prescribe a hydraulic engagement pressure for the clutches as a function of time to effect said gear shifts, which normally is fixed and can not be easily adapted between separately manufactured transmissions or after the transmission is incorporated in the drive line, the new control method of control comes with the freedom to prescribe the hydraulic engagement pressure as a function of the torque to be transferred through the transmission, which provides a much more flexible and adaptable control strategy and even allows adaptation of the calibration results during operation of the transmission maintaining a desired and constant performance, e.g. irrespective of wear of the clutches or of slight variations of technical characteristics between separate transmissions.

In the following the invention will be further explained along a drawing in which.

Figure 1:
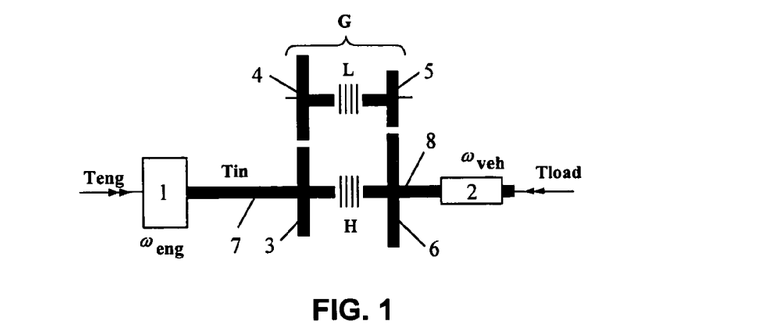
FIG. 1 is a modelled representation of a drive line.

FIG. 1 schematically represents a drive-line, i.e. the model of the drive-line according to the invention. This drive-line comprises two inertia components 1 and 2, a gear set G provided with an input shaft 7, an output shaft 8, gear wheels 3, 4, 5 and 6 constituting two gearings 3,4 and 5,6 as well as two friction elements L and H.

Friction element L, also denoted low clutch L, when engaged, i.e. activated, connects the said inertia components 1 and 2 through the gear set G, while friction element H, also denoted high clutch H, when activated connects the said inertia components 1 and 2 directly. In this example, an activated high clutch H thus realises a 1 to 1 transmission speed and torque ratio, while when low clutch L is activated and the high clutch H is in an opened state a transmission speed ratio i_gear is realised that depends on the gear ratio of the said two gearings 3, 4 and 5, 6. In this example, whenever relevant, the output/input speed ratio of the first gearing 4, 3 is chosen equal to 1 and that of the second gearing 6,5 is defined as 1/z. The overall "low" speed ratio of the transmission thus also being equal to 1/z. The output/input torque ratio of the transmission of course being equal to z. Factor z is chosen larger than 1 throughout this example.

Inertia 1 incorporates all inertia sub-components upstream of the clutches L and H, i.e. the inertia of the gear wheels 3 and 4, i.e. the input shaft 7 the engine and for example that of a torque converter, any other shafts and/or a continuously variable transmission (CVT) that may be included in the drive line. Inertia 2 incorporates all inertia sub-components downstream of the clutches L and H, i.e. the inertia of the gear wheels 5 and 6, the output shaft 8 and also includes the vehicle inertia. An engine torque $T_{eng}$ and a road load torque $T_{load}$ are respectively acting on inertia 1 and inertia 2. The engine torque $T_{eng}$ used in the drive-line model is the torque generated by the (combustion) engine or motor incorporated in the drive line. Often such engine torque $T_{eng}$ is estimated using electronic means based on different signals such as the rotational speed of the engine $\omega_{eng}$, the amount of fuel supplied to the engine and the so-called spark advance angle.

Figure 3:
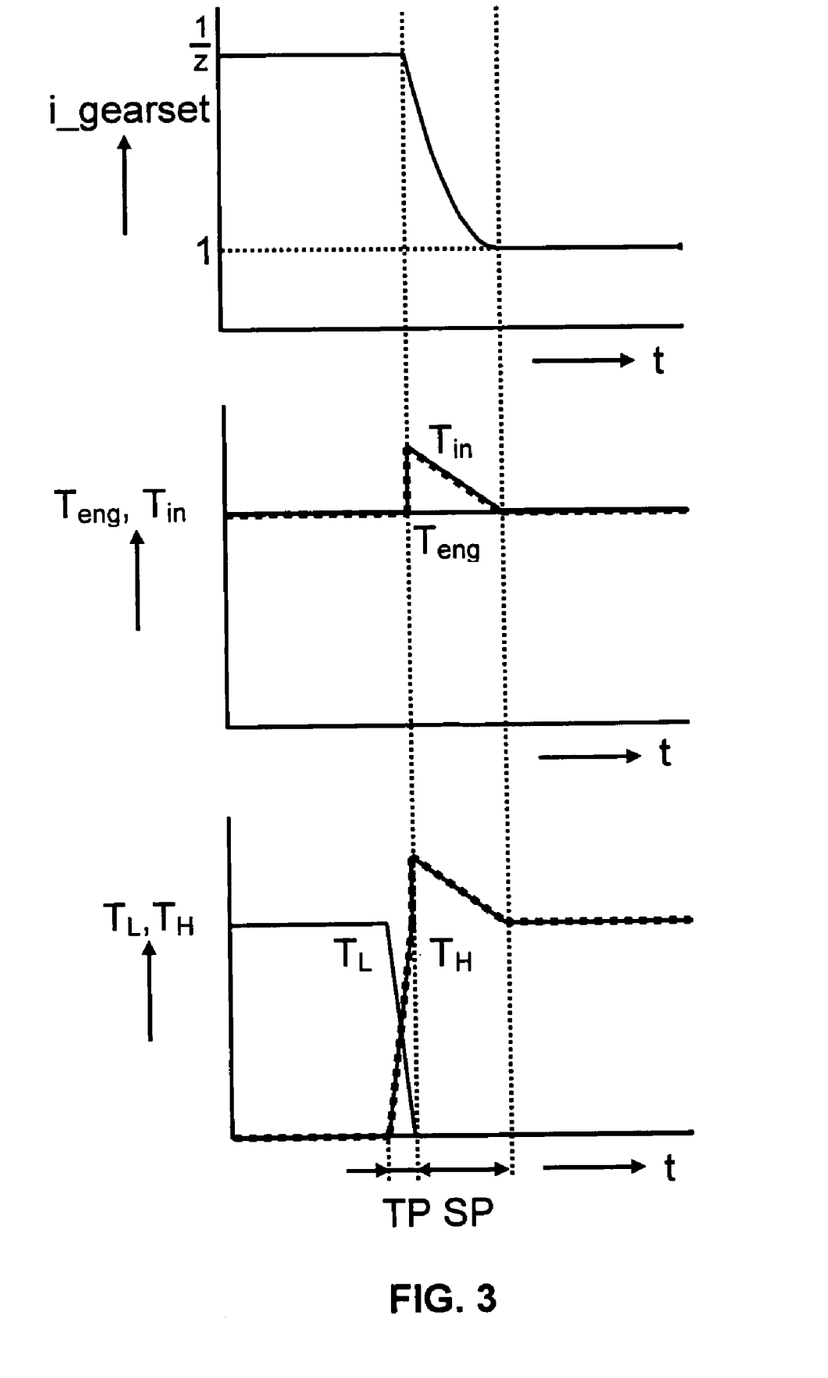
FIG. 3 shows graphs of the gear set speed ratio and several torque levels and clutch torque capacities versus time during a typical up shift with positive input torque.

According to the invention the transmission speed ratio i_gear of the gear set G is changed according to a prescribed trajectory as a function of time t during the clutch-to-clutch shift, which trajectory is denoted here as i_gearset. Preferably, such i_gearset trajectory has a parabolic-like shape, as indicated in FIG. 3 for a down shift. Such shape realises a fast paced ratio change early on in the shift, but such pace smoothly decreases to zero towards the completion of the gear shift. The actual speed ratio i_gear of the gear set G is forced to follow the set-point i_gearset(t) on the i_gearset trajectory by accelerating respectively decelerating inertia 1, also denoted $J_{inp}$, relative to inertia 2, also denoted $J_{veh}$, which in turn is effected by a controlled engagement of the clutches L and H.

The drive-line model of FIG. 1 is used to determine the gear set input torque $T_{in}$, i.e. the torque to be transferred by the gear set G to obtain the desired speed ratio trajectory set point i_gearset(t) during a clutch-to-clutch gear shift given a certain torque $T_{eng}$ generated or consumed (engine braking) by the engine and a torque $T_{loss}$ that accounts for torque losses in the drive line between the engine and the input side of the gear set G, which can in practice be negligible:

$$T_{in} = T_{eng} - J_{inp} \cdot d(\omega_{eng})/dt - T_{loss} \quad (1)$$

with:

$$d(\omega_{eng})/dt = d(i\_gearset(t))/dt \cdot \omega_{veh} + i\_gearset(t) \cdot d(\omega_{veh})/dt \quad (2)$$

Figure 2:
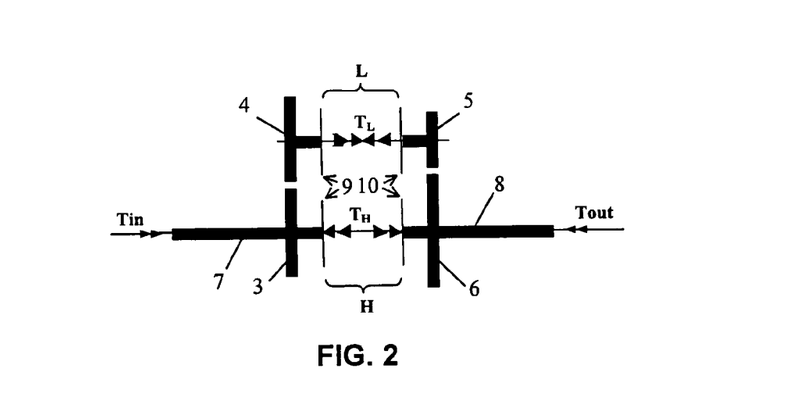
FIG. 2 defines the torque levels and clutch torque capacities for a stepped automatic transmission.

FIG. 2 defines the relevant torque levels and clutch torque capacities for a stepped automatic transmission embodied as the two stage gear set G comprising the two gearings 3,4 and 5,6, the low and high clutches L and H each having a friction or engagement element 9 or 10, alternatively denoted clutch plates 9, 10 are provided between the said gearings 3,4 and 5,6. $T_L$ and $T_H$ are the clutch torque capacities the low clutch L and the high clutch H respectively, i.e. the instantaneous torque level that may be transmitted by the respective clutch L, H. In the following, the relation between $T_{in}$ and $T_L$ respectively $T_H$ is derived, whereby the said clutch torque capacities $T_L$ and $T_H$ are such that during both the up shift and the down shift, $T_L$ is smaller than or equal to zero and $T_H$ is greater than or equal to zero, i.e.:

$$T_L \leq 0, T_H \geq 0 \quad (3)$$

These features are illustrated in FIG. 2 by means of the double arrows and are a consequence of the fact that for the low clutch L the clutch plate 10 associated with the output shaft 8 is rotating at the same (low gear engaged) or a higher speed than the clutch plate 9 associated with the input shaft 9 such that engagement of this clutch at a down shift of the transmission generates a negative torque on the input shaft because the input shaft is required to speed up. For the high clutch H the exact opposite analysis would be true.

Then, for the input side, i.e. shaft 7 of the gear set G, the following torque equation can be given:

$$T_{in} = T_H + T_L \quad (4)$$

For the output side, i.e. shaft 8 of the gear set G the following torque equation holds:

$$T_{out} = T_H + z \cdot T_L \quad (5)$$

For the calculation of $T_L$ and $T_H$, the equations (3), (4) and (5) are utilised. Since this set of equations is underdetermined, an extra restraint, i.e. an additional requirement is added, which is based on the idea of a requirement in accordance with a main purpose of the invention, i.e. that the clutch-to-clutch gear shift should disturb the output torque $T_{out}$ as little as possible. This is achieved when a torque loss in the gear set G as a result of power dissipation by the slipping clutches L, H is minimised, which is the same as maximising the transmission output torque $T_{out}$.

Combining equations (4) and (5) gives:

$$T_{out} = T_{in} + (z-1)T_L \quad (6)$$

Because $T_L \leq 0$, maximising $T_{out}$ means minimising the absolute value of $T_L$, still satisfying the constraints: $T_L \leq 0$ and $T_H \geq 0$. The constraint for $T_H$ is rewritten by applying equation (4):

$$T_H = T_{in} - T_L \geq 0 \quad (7)$$

which results in:

$$T_L \leq T_{in} \quad (8)$$

Therefore, the problem of controlling the clutch torque capacities $T_L$ and $T_H$ of the respective low and high clutches L, H smoothly and with minimal loss of power in all of the said relevant conditions of the transmission and changes therein that are conceivable during gear shifting, which problem underlies the present invention, may be conveniently solved by adhering to the following requirements derived as a part of the invention:

$$\text{Maximise } T_L \text{ with } T_L \leq 0 \text{ and } T_L \leq T_{in} \quad (9)$$

Further, given that $T_H$ follows from equation (5), in accordance with the present invention two solutions are found for the constrained optimisation problem represented by the said requirements (9):

$$T_L = 0, T_H = T_{in} \text{ if } T_{in} \geq 0, \text{ or } T_L = T_{in}, T_H = 0 \text{ if } T_{in} < 0. \quad (10)$$

This leads to the conclusion that during the gear shifts from L→H (up shift) and from H→L (down shift), any positive input torque $T_{in}$ is to be transferred by the high clutch H while simultaneously the torque capacity $T_L$ of the low clutch L is required and controlled to be zero. On the other hand, at such gear shifts any negative input torque $T_{in}$ is to be transferred by the low clutch L, now with the torque capacity $T_H$ of the high clutch H being required and controlled to be zero.

The thus found requirements for $T_L$ and $T_H$ during shifting can be extended conveniently to include also transmission conditions wherein either the high clutch H or low clutch L is fully engaged, i.e. shows no clutch slip and transfers the entire input torque $T_{in}$ through the transmission. This results in the following algorithm for determining both occasions of the clutch torque capacities $T_L$ and $T_H$, denoted the clutch torque algorithm:

```
IF (i_gear = 1/z)    {i.e. low clutch engaged}
    T_L = T_in;
    T_H = 0;
ELSE
    IF (i_gear = 1) {i.e. high clutch engaged}
        T_L = 0;
        T_H = T_in;
    ELSE
        IF (T_in > 0)    {i.e. shifting with positive input torque}
            T_L = 0;
            T_H = T_in;
        ELSE             {i.e. shifting with negative input torque}
            T_L = T_in;
            T_H = 0;
        END
    END
END
```

This clutch torque algorithm determines for all possible situations the torque to be transferred by the clutches L, H, alternatively denoted the clutch torque capacities $T_L$, $T_H$, depending on the desired input torque $T_{in}$. The algorithm is able to handle up shifts and down shifts for positive as well as negative input torque $T_{in}$. Even a change in the type of gear shift during the shift itself, such as when the sign of the torque transferred through the transmission changes or when a down shift is suddenly desired when the up shift is still being performed does not pose a control problem, but rather such changing conditions are inherently taken into account.

FIG. 3 illustrates a typical up shift at positive engine/input torque $T_{eng}$, $T_{in}$. The upper graph of FIG. 3 gives the instantaneously desired ratio i_gearset(t) of the gear set G versus, i.e. as a function of the passage of time t, whereby the x- or i_gearset-axis values increase towards the y- or time axis. Factor 1/z and 1 are the output/input speed ratios of the transmission respectively with the low clutch L engaged, i.e. coupling the transmission input shaft 7 with the output shaft 8 via the gear set G, and with the high clutch H engaged, i.e. realising a direct drive between the transmission input shaft 7 and output shaft 8. The manner in which the transmission speed ratio i_gear between the output shaft 8 and the input shaft 7 is to be changed during a down shift (from speed ratio 1/z to ratio 1) is prescribed, i.e. pre-programmed as the trajectory shown in the upper graph of FIG. 3. The same trajectory can also be prescribed for an up shift simply by replacing 1/z by 1 and 1, whereby the x- or i_gearset-axis values decrease towards the y- or time axis.

The middle graph shows the engine torque $T_{eng}$ as the smooth line and the gear set G input torque $T_{in}$ as the marked line both versus time t. In this example, the engine torque $T_{eng}$ is maintained at a constant level during the entire gear shift. During the actual shifting of the transmission speed ratio, the input torque $T_{in}$ no longer equals the engine torque $T_{eng}$, because of a positive torque generated in the drive line due to the deceleration of the input inertia $J_{inp}$, inertia 1, during the gear shift.

The bottom graph shows the low clutch L torque capacity $T_L$ as the smooth line and the high clutch H torque capacity $T_H$ as the marked line both versus time t. The clutch torque algorithm according to the present invention, prescribes that before the gear shift is initiated the low clutch L torque capacity $T_L$ is equal to the input torque $T_{in}$, whereas the high clutch H torque capacity $T_H$ is equal to zero. At the instance the down shift at positive input torque, which type of gear shift was chosen as the example in FIG. 3, becomes desired the clutch torque algorithm prescribes that the low clutch L torque capacity $T_L$ is to be controlled to zero, whereas the high clutch H torque capacity $T_H$ is to be controlled to correspond to the input torque $T_{in}$. This phase of the gear shift action is the so called torque phase TP, which is performed in advance of effecting the actual changing of the transmission speed ratio, because only the high clutch H is able to transfer the positive input torque $T_{in}$ during the gear shift as was explained in the above. According to FIG. 3 the said torque capacities $T_H$ and $T_L$ are controlled along linear trajectories. However, this such trajectory is a matter of choice and may be specifically adapted to suit the specific application of the transmission. Generally speaking it is preferred if the torque phase TP takes as little time as possible, so that the characteristics of the (electro/hydraulic) system for controlling the said torque capacities $T_H$ and $T_L$ will determine the optimum shape and maximum attainable angle of inclination of the said trajectories.

After the torque phase TP and in the so called shift phase SP of the gear shift, the actual transmission speed ratio change takes place automatically by controlling the clutch torque capacity $T_H$ of the engaging high clutch H to coincide with the input torque $T_{in}$ in accordance with the invention.

Inter alia, it is remarked that it may be considered advantageous in steady state transmission conditions, i.e. when no gear shift is to be performed, to apply a safety factor Sf larger than 1 to the torque transmitting capacity $T_L$, $T_H$ of the respective clutch L, H in relation to the gear set input torque $T_{in}$ that is to be transmitted by the said clutch L, H:

$$T_L, T_H = Sf \cdot T_{in} \text{ with } Sf > 1 \text{ in steady state} \quad (11)$$

In this approach it is prevented that the respective clutch L, H slips during steady state transmission operation, for example as a result of inaccuracies in the input torque $T_{in}$ determined in accordance with the invention in relation to the actual torque to be transmitted or of shock load that may be introduced by the load. Preventing clutch slip reduces clutch wear and maximises the efficiency of the power transmission. Still, this approach also has the disadvantage that before a gear shift can be initiated, the respective torque transmitting capacity $T_L$, $T_H$ needs to be reduced to coincide with input torque $T_{in}$, e.g. by accurately reducing said safety factor Sf to 1.

Figure 4:
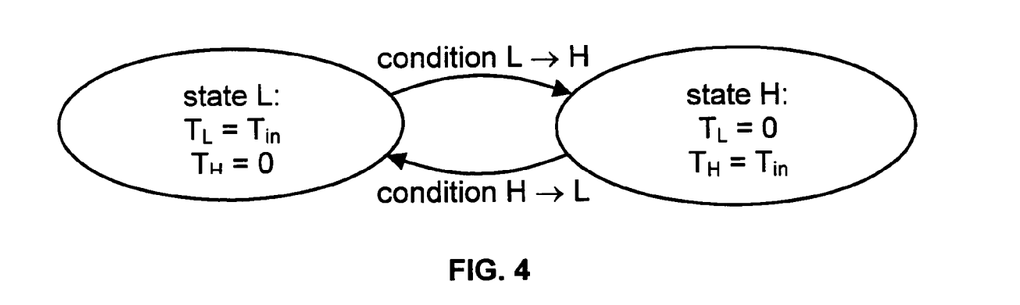
FIG. 4 is a state-machine of the control method according to the invention.

FIG. 4 shows the clutch torque algorithm according to the invention in terms of a state-machine. State L is active if the low clutch L is fully engaged or during gear shifts with negative input torque $T_{in}$. In this state the input torque $T_{in}$ is transferred by the low clutch L alone. State H is active if the high clutch H is fully engaged or during up shifts or down shifts with positive input torque $T_{in}$. In this state the input torque $T_{in}$ is transferred by the high clutch H alone. Note that these two states L, H are valid not only in steady state transmission operation, but also during the shift phase SP of the respective gear shift action.

If the condition H→L is true, i.e. when a down shift is desired, then a transfer from state H to state L is initiated. Initiation of the transfer from the state L to state H takes place if condition L→H is true and an up shift is desired. Note that these transfers in fact represent the torque phase TP of the respective gear shift action.

Figure 5:
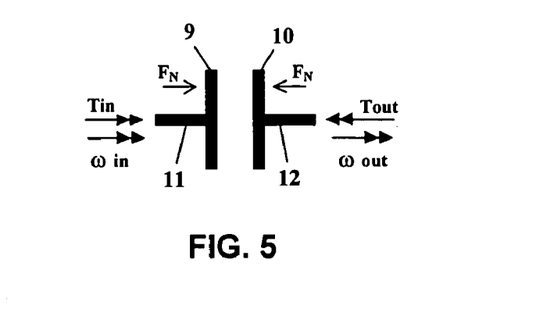
FIG. 5 is a modelled representation of a friction element.

FIG. 5, provides a schematic representation of a clutch L, H, alternatively denoted friction element L, H. According to the present invention the low and high clutches L and H as commonly known in transmissions and in particular the clutch torque capacities $T_H$ and $T_L$ may be incorporated in the drive line model according to the invention by means of a relatively simple, but realistic model thereof. In such clutch model, $F_N$ represents a clamping or engagement force that brings friction or clutch plates 9 and 10, which are associated with a clutch input shaft 11 and a clutch output shaft 12 respectively. Such force clamping force $F_N$ may be effected in a generally known fashion by a hydraulic clutch engagement pressure $C_P$ acting in a piston/cylinder assembly associated with at least one of the clutch plates 9, 10 of the clutch. In turn, such engagement pressure $C_P$ may be generated and controlled also in a generally known fashion by means of a hydraulic pump and a, preferably electronically controllable, pressure control valve.

For the clutch model the following equations are departed from, whereby T stands for torque, ω for rotational speed and the subscripts "in" and "out" respectively denote the input and output shafts 11 and 12 of the clutch L, H:

$$T_{in} = T_{out} = T_L, T_H, \omega_{slip} = \omega_{in} - \omega_{out}. \quad (12)$$

wherein $T_{in}$ and $T_{out}$ denote the torque transferred by the friction element L, H, i.e. between the clutch plates 9 and 10 and $\omega_{in}$ and $\omega_{out}$ respectively denote the rotational speed of the clutch input shaft 11 and the clutch output shaft 12. Then $T_L$, $T_H$ may be calculated from:

$$|T_L|, |T_H| <= \mu_{stat} \cdot C \cdot r \cdot F_N \text{ if } \omega_{slip}=0 \text{ and } T_L, T_H = -\mu_{dyn} \cdot C \cdot r \cdot F_N \text{ if } \omega_{slip}<0, T_L, T_H = \mu_{dyn} \cdot C \cdot r \cdot F_N \text{ if } \omega_{slip}>0, \quad (13)$$

wherein C is a constant that depends on the specific clutch design (e.g. number and shape of the friction plates 9, 10), r is an effective radius of the friction plates 9 and 10 and $\mu_{stat}$ and $\mu_{dyn}$ are the static respectively the dynamic coefficients of friction between such friction plates 9, 10. In an advanced implementation of the control method according to the invention the coefficients of friction may be adapted during operation of the transmission, e.g. based on clutch engagement pressure $C_P$ versus clutch torque capacity $T_L$, $T_H$ measurement, so as to be able to account for temperature, wear or other influence factors.

Figure 6:
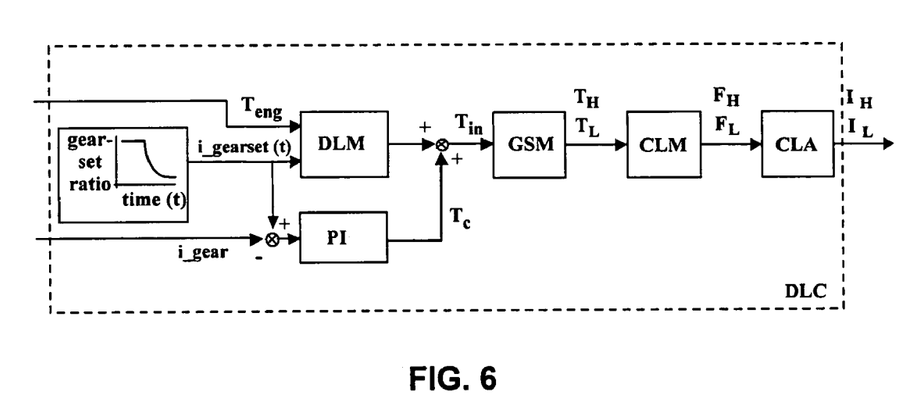
FIG. 6 provides a block-scheme of the control method according to the invention.

FIG. 6, provides a block scheme of a drive line controller DLC operating in accordance with the control method according to the invention. This controller DLC comprises several blocks. First, the prescribed desired speed ratio versus time t trajectory i_gearset of the gear set G provides an instantaneously desired transmission speed ratio i_gearset(t). Based on this desired speed ratio i_gearset(t) and on the engine torque $T_{eng}$, the gear set input torque $T_{in}$ is determined using the above-described drive-line model DLM according to the invention. The gear set input torque $T_{in}$ is subsequently used to determine the desired clutch torque capacities $T_L$, $T_H$ in accordance with the gear set model GSM, i.e. the previously described clutch torque algorithm. A clutch model CLM, e.g. as described in the above, is used to obtain the clamping forces $F_L$ and $F_H$ for the low clutch L and the high clutch H respectively that are required to realise the said desired clutch torque capacities $T_L$, $T_H$. Finally, actuator control signals $I_L$, $I_H$ that are required to realise the said clamping forces $F_L$ and $F_H$ are determined in block CLA. These actuator control signals $I_L$, $I_H$ are the output signal of the drive line controller DLC, which are fed to a suitable controller (not shown). Generally speaking, these actuator control signals $I_L$, $I_H$ will be electric currents used for operating electronically controllable pressure valves each controlling one respective clutch engagement pressures $C_P$, which signals $I_L$, $I_H$ may be obtained using a characteristic of the pressure valve that gives the dependency between the actuation signal fed to the valve and the pressure set in response thereto.

In a further elaboration of the block scheme according to the invention, which is also indicated in FIG. 6, and because of possible inaccuracies and deviations in the DLC, a feed-back of the actually realised transmission speed ratio i_gear to the DLC may be incorporated in the control method based on measurement of the rotational speed of the transmission output shaft (8) and input shafts (7). According to the invention, this is preferably realised by generating a torque correction signal $T_C$ in dependency on the difference between the instantaneously desired speed ratio i_gearset(t) and the actually realised transmission speed ratio i_gear, which torque correction signal $T_C$ is added to the gear set input torque $T_{in}$ determined by the DLM. A generally known PID- or PI-controller may be applied for this purpose. Alternatively or additionally, the said difference between the actual and desired transmission ratio may be used in the adaptation of the DLC input signal representing the engine torque $T_{eng}$ signal or of the method employed in estimating the engine torque $T_{eng}$.

Figure 7:
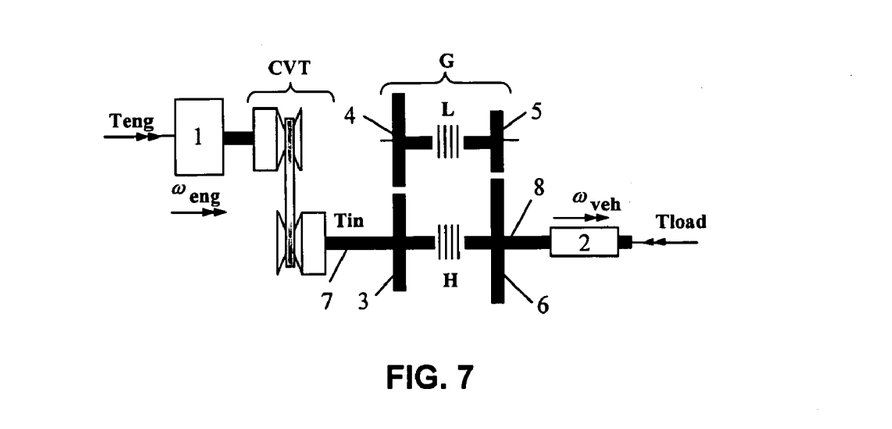
FIG. 7 represents a drive-line incorporating a continuously variable transmission.

If the drive-line comprises not only the gear set G, but also a continuously variable transmission CVT as indicated in FIG. 7 and if the transmission speed ratios of these two drive-line components are desired to be shifted simultaneously, the individual ratio shifts of the said two components may have to be performed in a controlled and mutually adapted manner to obtain a smoothly changing or possibly even a constant overall speed ratio between the said two inertia components 1 and 2. Since the clutch-to-clutch shift controller proposed in the above has been developed for this type of drive-line configuration, which is for example known from the European patent 0 787 927, it may be considered desirable that the overall output/input speed ratio $\omega_{veh}/\omega_{eng}$ of the drive-line is virtually constant during the gear shift of the gear set G. This implies that when the transmission speed ratio of the gear set G is changed according to a prescribed trajectory i_gearset as a function of time t during the clutch-to-clutch shift, a ratio change trajectory of the CVT should be more or less the inverse function of such trajectory. In this configuration the rotational speed of the engine $\omega_{eng}$ may differ from that of the input shaft 7, which means that in the above-mentioned equations (1) and (2) the rotational speed both of the transmission input shaft 7 and that of the engine $\omega_{eng}$ should be taken into account separately, each associated with the relevant components of $J_{inp}$.

The invention claimed is:

1. A control method for effecting a gear shift in a stepped automatic transmission for transmitting power between two inertia components (1; 2) at distinct speed ratios, which inertia components at least represent an engine and a load respectively and which transmission comprises an input shaft (7) and an output shaft (8) with a first power transmission path (3, H, 6) and a second power transmission path (3, 4, L, 5, 6) provided there between, the said power transmission paths (3, H, 6; 3, 4, L, 5, 6), respectively being provided with a high clutch (H) having an adjustable torque transmitting capacity $T_H$ and a low clutch (L) having an adjustable torque transmitting capacity $T_L$, comprising the steps of:
 determining a gear set input torque $T_{in}$ to be transmitted by the transmission in the direction from the input shaft (7) to the output shaft (8) and
 controlling the said torque transmitting capacities $T_H$ and $T_L$ in dependency on the gear set input torque $T_{in}$ to be transmitted such that:
  a) if $T_{in} \geq 0$ then $T_H = T_{in}$ and $T_L = 0$
  b) if $T_{in} < 0$ then $T_H = 0$ and $T_L = T_{in}'$.

2. The control method according to claim 1, characterised in that the method further comprises the steps of:
 prescribing a desired speed ratio versus time trajectory (i_gearset) for the speed ratio of the output shaft (8) and the input shaft (7) during the gear shift and
 determining the gear set input torque $T_{in}$ at least in dependency on an engine torque $T_{eng}$ generated or consumed by the engine, which input torque $T_{in}$ is required to realise an instantaneously desired speed ratio (i_gearset(t)) prescribed by the speed ratio trajectory (i_gearset).

3. The control method according to claim 2, characterised in that the prescribed desired speed ratio trajectory (i_gearset(t)) is defined such that its mathematical derivative decreases in dependency on the time (t), preferably the prescribed desired speed ratio trajectory (i_gearset) is a parabolic function of the time (t).

4. The control method according to claim 2, characterised in that the gear set input torque $T_{in}$ is determined by the equation:

$$T_{in} = T_{eng} - J_{inp} \cdot \{d(i\_gearset(t))/dt \cdot \omega_{veh} + i\_gearset(t) \cdot d(\omega_{veh})/dt\}$$

wherein $J_{inp}$ is the inertia of the inertia component (1) associated with the input shaft (7) and $\omega_{veh}$ is the rotational speed of the output shaft.

5. The control method according to claim 1, characterised in that the method further comprises the steps of:
  determining the actual transmission speed ratio (i_gear),
  determining the difference between the prescribed speed ratio (i_gearset(t)) and the actual transmission speed ratio (i_gear) and
  correcting the determined gear set input torque $T_{in}$ or the determined engine torque $T_{eng}$ in dependency on the said determined difference.

6. The control method for controlling a stepped automatic transmission for transmitting power between two inertia components (1; 2) at distinct speed ratios, which inertia components at least represent an engine and a load respectively and which transmission comprises an input shaft (7) and an output shaft (8) with a first power transmission path (3, H, 6) and a second power transmission path (3, 4, L, 5, 6) provided there between, the said power transmission paths (3, H, 6; 3, 4, L, 5, 6), respectively being provided with a high clutch (H) having an adjustable torque transmitting capacity $T_H$ and a low clutch (L) having an adjustable torque transmitting capacity $T_L$, comprising the steps of:
  determining the instantaneously desired gear ratio set input torque $T_{in}$ to be transmitted by the transmission in the direction from the input shaft (7) to the output shaft (8) and
  controlling the said torque transmitting capacities $T_H$ and $T_L$ in dependency on the gear set input torque $T_{in}$ to be transmitted such that:
  a) if $T_{in} \geq 0$ then $T_H = Sf \cdot T_{in}$ and $T_L = 0$
  b) if $T_{in} < 0$ then $T_H = 0$ and $T_L = Sf \cdot T_{in}$
  with $Sf \geq 1$ when the speed ratio of the transmission is to be constant and
  with $Sf = 1$ when a gear shift of the transmission is to be effected.

7. The metode according to claim 2, characterised in that a controller (DLC) for stepped automatic transmission designed for carryng out said method is provided with means for:
  determining the instantaneously desired speed ratio (i_gearset(t)),
  determining the gear set input torque $T_{in}$ (DLM),
  determining the desired clutch torque capacities $T_H$, $T_L$ (GSM),
  determining desired clamping forces $F_H$, $F_L$ (CLM) and
  determining actuator control signals $I_H$, $I_L$ (CLA), which signals are output signals of the drive line controller (DLC).

8. The method according to claim 7, wherein the controller (DLC) is provided with inputs for receiving input signals representing at least the engine torque $T_{eng}$ and the actual transmission speed ratio (i_gear) and with means (PI) for determining a torque correction signal $T_C$ in dependency on the difference between the prescribed speed ratio (i_gearset(t)) and the actual transmission speed ratio (i_gear).

9. The method according to claim 7, wherein said stepped automatic transmission is provided with the drive line controller.

10. The method according to claim 9, wherein the drive line provided with the stepped automatic transmission is also provided with a continuously variable transmission (CVT).

11. The control method according to claim 3, chracterised in that the gear set input torque $T_{in}$ is determined by the eqution:

$$T_{in} = T_{eng} - J_{inp} \cdot \{d(i\_gearset(t))/dt \cdot \omega_{veh} + i\_gearset(t) \cdot d(\omega_{veh})/dt\}$$

wherein $J_{inp}$ is the inertia of the inertia component (1) associated with the input shaft (7) and $\omega_{veh}$ is the rotational speed of the output shaft.

12. The method according to claim 8, wherein said stepped automatic trasmission is provided with drive line controller.

* * * * *